Figure 1:
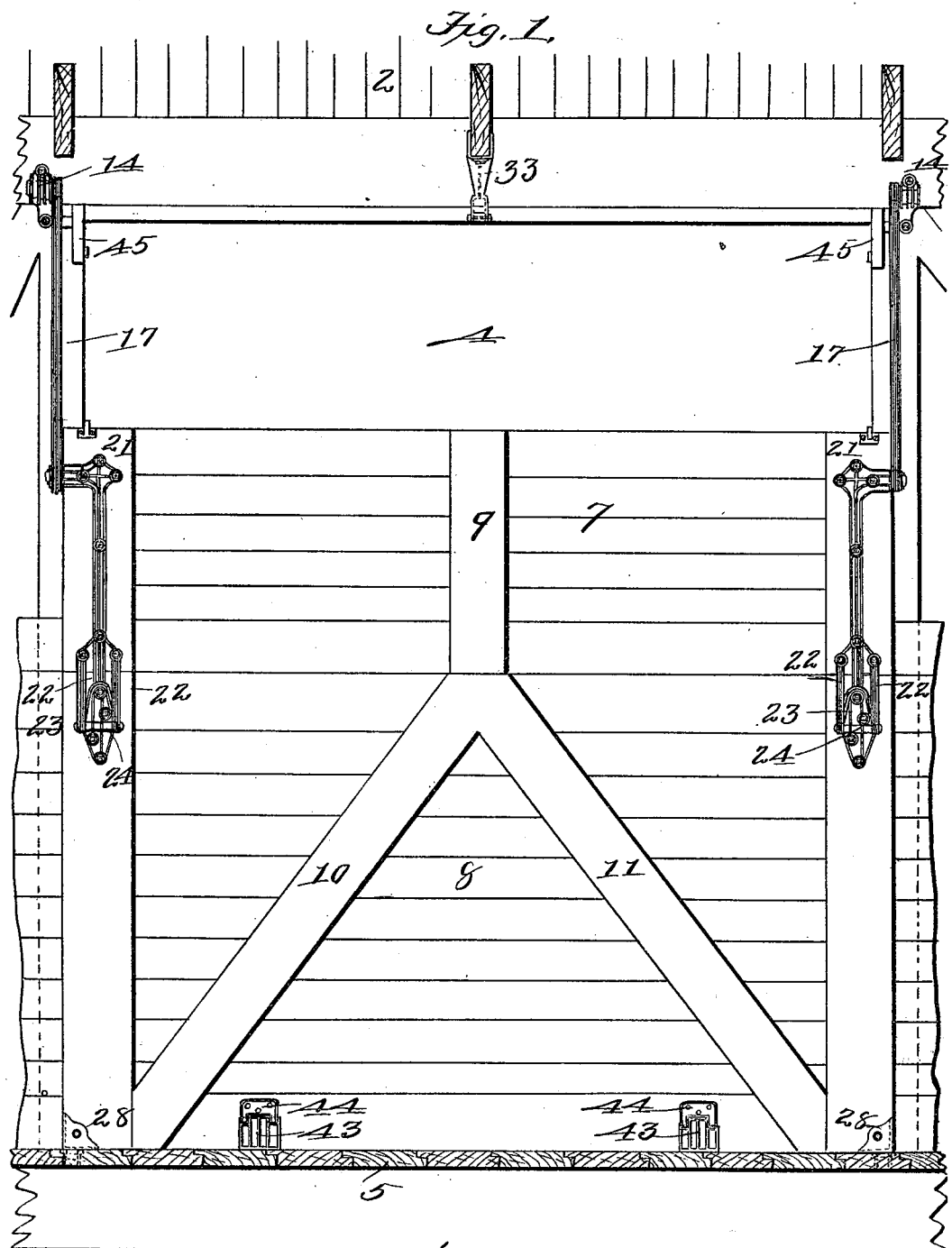

No. 665,239. Patented Jan. 1, 1901.
C. LINSTROM.
CAR DOOR.
(Application filed July 28, 1900.)
(No Model.) 5 Sheets—Sheet 1.

Witnesses:
C. D. Hesler
Dennis Sumby

Inventor
Charles Linstrom
By James L. Norris
Atty.

No. 665,239. Patented Jan. 1, 1901.
C. LINSTROM.
CAR DOOR.
(Application filed July 28, 1900.)
(No Model.) 5 Sheets—Sheet 3.

Witnesses,
C. D. Kesley.
Dennis Sumby.

Inventor
Charles Linstrom
By James L. Norris

No. 665,239. Patented Jan. 1, 1901.
C. LINSTROM.
CAR DOOR.
(Application filed July 28, 1900.)
(No Model.) 5 Sheets—Sheet 4.
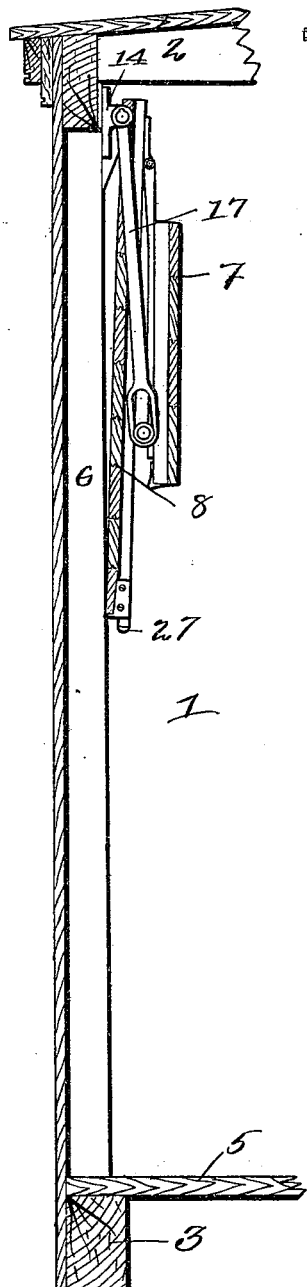
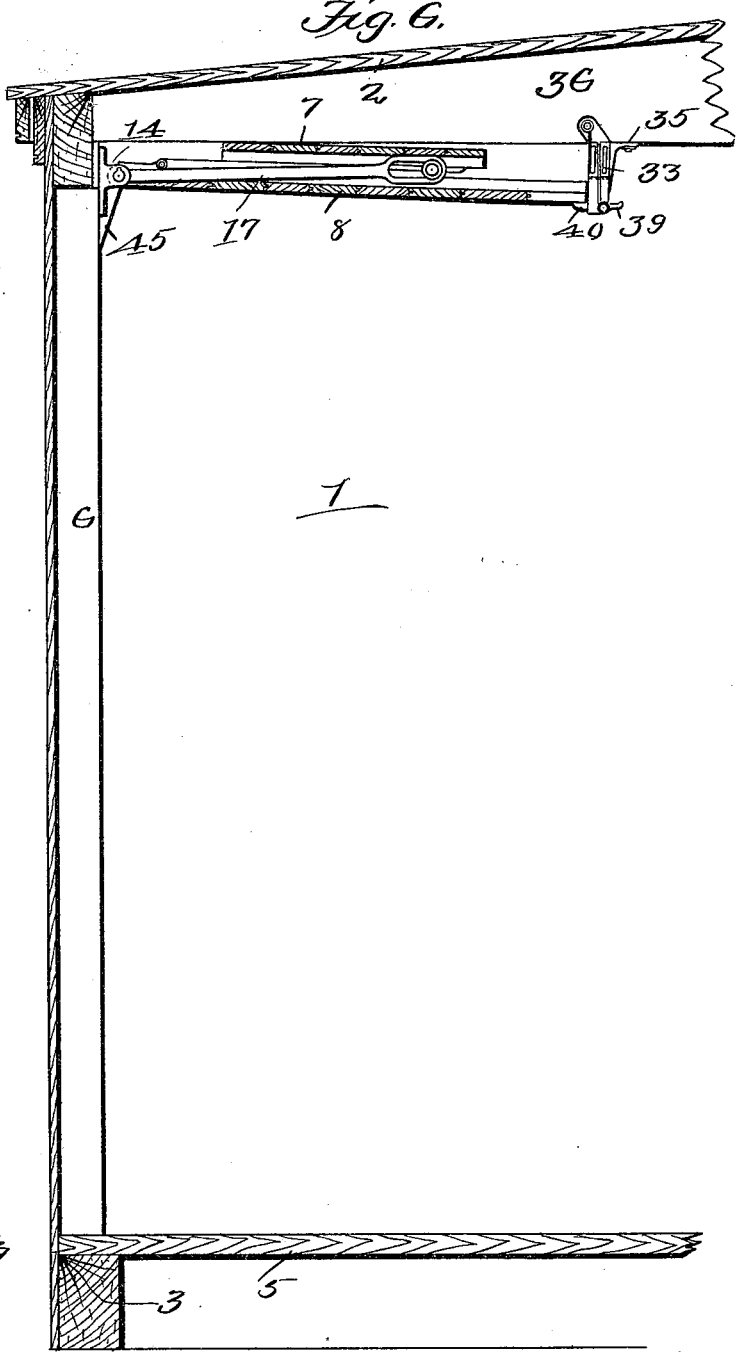
Witnesses:
C. D. Kesler
Dennis Sumby
Inventor
Charles Linstrom
By James L. Norris
Atty.
THE NORRIS PETERS CO., PHOTO-LITHO., WASHINGTON, D. C.

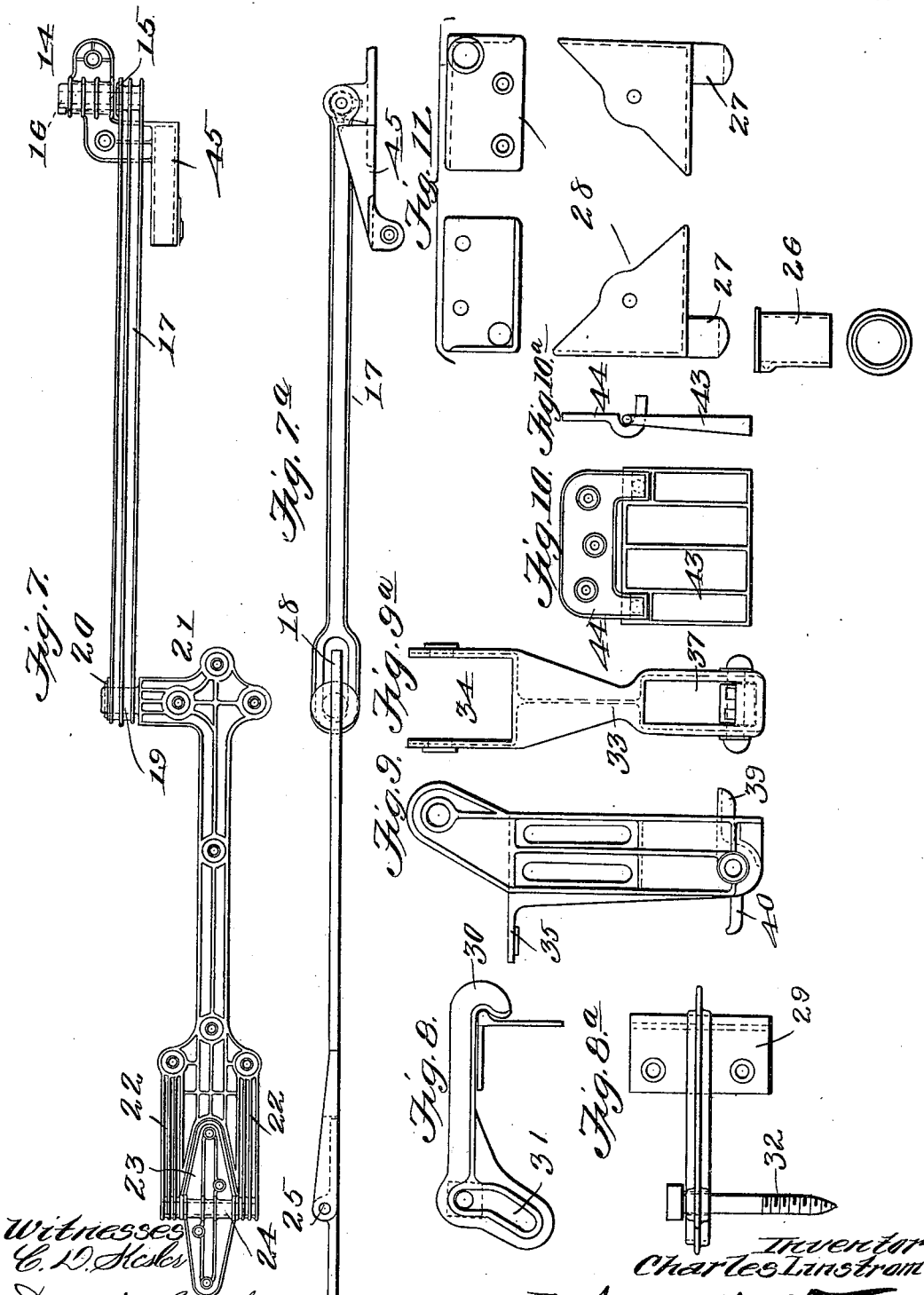

UNITED STATES PATENT OFFICE.

CHARLES LINSTROM, OF VICKSBURG, MISSISSIPPI.

CAR-DOOR.

SPECIFICATION forming part of Letters Patent No. 665,239, dated January 1, 1901.

Application filed July 28, 1900. Serial No. 25,170. (No model.)

*To all whom it may concern:*

Be it known that I, CHARLES LINSTROM, a citizen of the United States, residing at Vicksburg, in the county of Warren and State of Mississippi, have invented new and useful Improvements in Car-Doors, of which the following is a specification.

This invention relates to certain new and useful improvements in car-doors, and more particularly to grain-car doors, although the door is adapted for use in connection with freight-cars of various description.

The invention relates more particularly to the class of doors usually provided upon freight-cars employed for the transportation of grain, which are known as "grain-doors," and are designed when in use to close only the lower portion of the car-opening in each side of the car and when not in use to be raised to the top of the door-opening and swung back to a substantially horizontal plane, whereby the said opening is left clear and the door itself placed in an out-of-the-way position.

Grain-doors of the above class now in general use are commonly arranged to be vertically adjustable upon a pair of stationary guide-rods secured to the inner face or outer side of the door-jambs of the car. Consequently when transporting other freight besides grain these guides frequently interfere with the storing of the freight in the car or are liable to become bent or injured in the loading or unloading of the freight or the jarring of the freight against the guides while in transit, thereby impairing or destroying the utility of the guides for use in connection with the doors. Therefore the invention aims to construct a grain-door dispensing with the stationary guides, so that when the door is elevated to its horizontal position no part of the same or its connections will be below the top of the car-door opening. Consequently the door will not materially interfere with the use of the car for freight of any description or be itself injuriously affected by such use; and to this end the invention consists of a grain-door vertically adjustable by means of a pair of pivoted hangers connected at their lower end to an intermediate hinge secured to the upper section of the grain-door, which is so constructed that the sections will be hinged together below their abutting edges.

The intermediate hinge is provided with a bifurcated lower end which receives a pivot-pin for hinging the former to a bearing-bracket carried by the lower section of the grain-door. Means secured to the top of the car for suspending the door in a horizontal position and other details of construction will be more specifically hereinafter referred to, all of which are so arranged that when the car-door is vertically adjusted and brought to its horizontal position the door and its connections will swing entirely free of the car-door opening.

The invention further consists of the novel combination and arrangement of parts, hereinafter more specifically described, illustrated in the accompanying drawings, and particularly pointed out in the claims hereunto annexed, and in describing the invention in detail reference is had to the accompanying drawings, forming a part of this specification, whereon like numerals of reference indicate corresponding parts throughout the several views, and in which—

Figure 2:
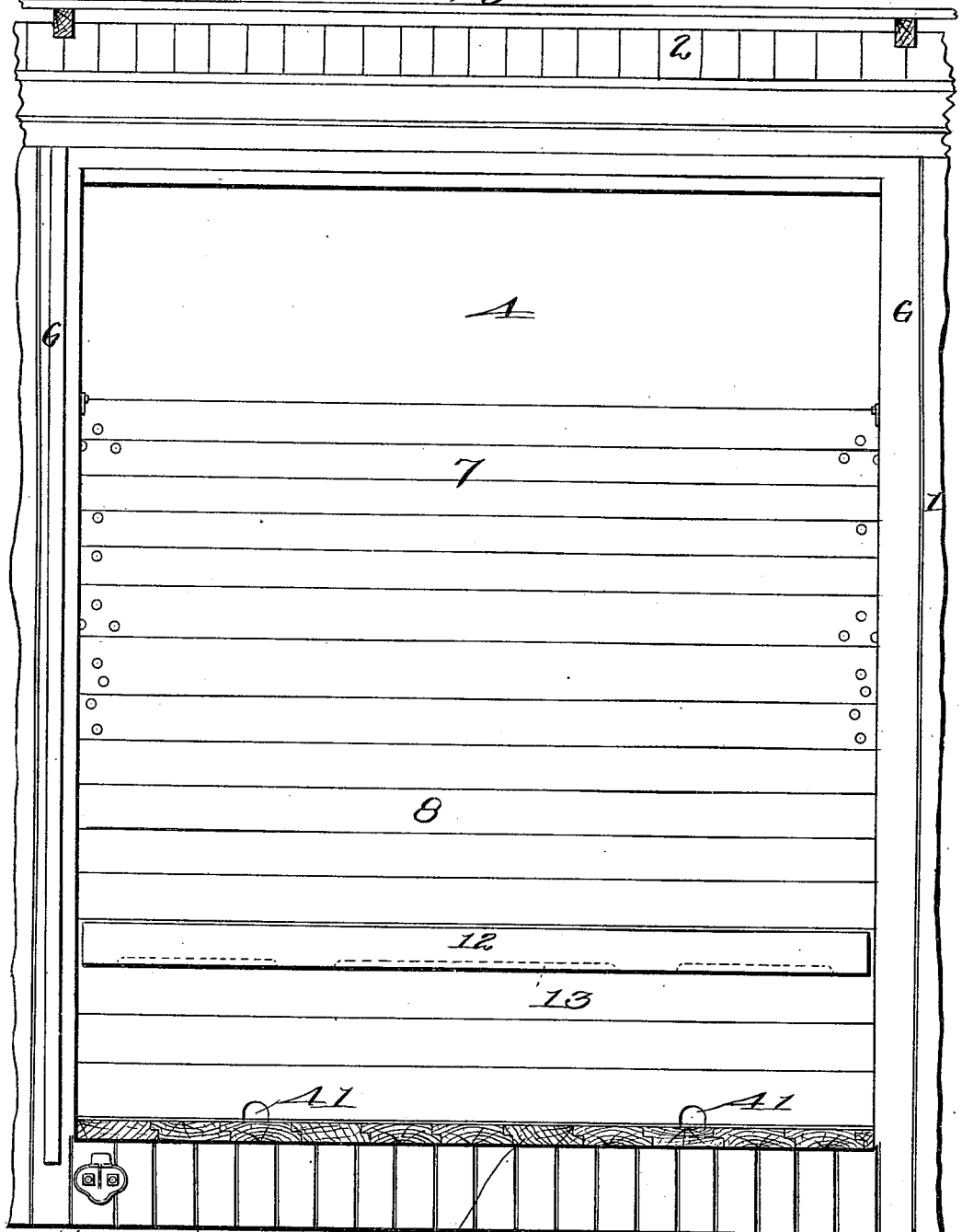
Figure 3:
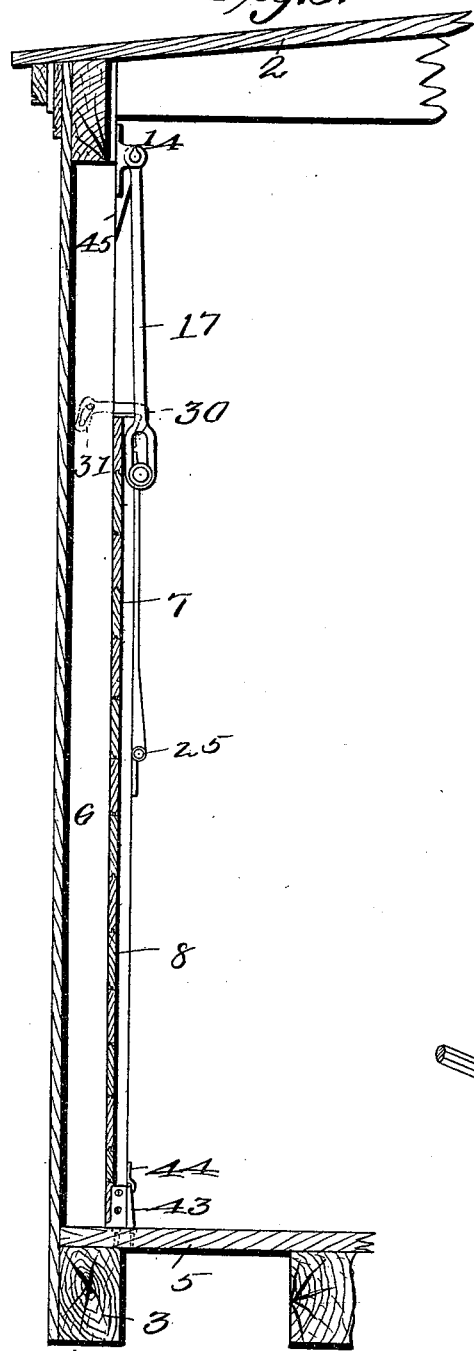
Figure 4:
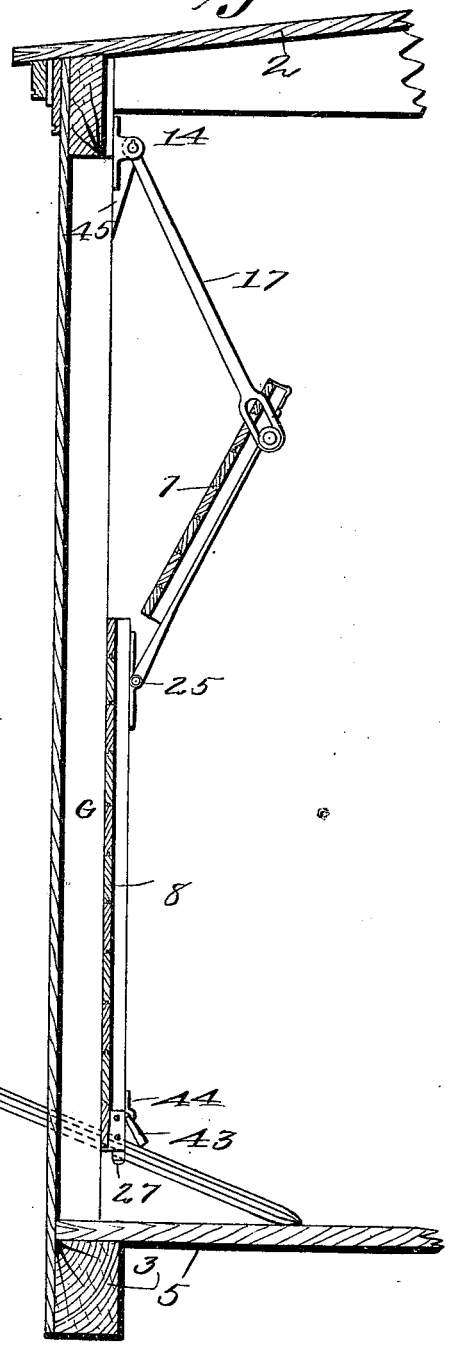

Figure 1 is a rear elevation of one of the walls of a car with my improved door connected thereto. Fig. 2 is a front elevation. Fig. 3 is a vertical section thereof. Fig. 4 is a like view showing the door about to be elevated. Fig. 5 is a like view with the door elevated. Fig. 6 is a similar view with the door secured in its horizontal position. Fig. 7 is a front plan of the suspending device for the door. Fig. 7$^a$ is a top plan thereof. Fig. 8 is a side elevation of the locking device for the door. Fig. 8$^a$ is a top plan thereof. Fig. 9 is a side elevation of the supporting device for the door when swung horizontally. Fig. 9$^a$ is a rear plan thereof. Fig. 10 is a front elevation of the gate or shutter for the lever-opening. Fig. 10$^a$ is a side elevation thereof. Fig. 11 illustrates detail views of the retaining-boss and its socket for the lower corners of the door.

Referring to the drawings by reference-numerals, 1 denotes a portion of a freight-car, 2 the top, and 3 the floor thereof. The car is provided with the car-door opening 4, having the sill 5 and jambs 6. Arranged within the opening 4 is a grain-door, consisting of the upper section 7 and lower section 8, which are of the ordinary construction and provided on their rear face with the studs or braces 9, 10, and 11, respectively, and on their outer face with the hand-grip 12, consisting of a strip of suitable material extending across the lower section 8 and formed with a series of recesses, as indicated in dotted lines, as at 13.

Secured to the car at each side of the door-opening 4, near the top thereof, is a pair of supporting-brackets 14, each formed with a bearing-sleeve 15 to receive the pin 16, carried by the upper end of the hanger or link 17, having an oval-shaped slot formed in its lower end, as at 18. The hanger or link 17 extends below the top edge of the section 7 of the door and is pivotally as well as slidably connected to the section 7 by means of the bearing-pin 19 extending through the slot 18 and secured to the hanger or link by means of the split pin 20. The bearing-pin is formed integral with the upper end of the elongated plate 21, secured to the section 7. The plate 21 is provided with a bifurcated lower end 22, surrounding the bracket 23, connected to the upper end of the section 8. The bracket 23 is provided at its lower end with a bearing-sleeve 24, through which extends, as well as through the bifurcated ends of the plate 21, a bearing-pin 25 for hinging the two sections of the door together below the abutting edges thereof.

The reference-numeral 26 denotes a thimble-socket secured to each side of the door-opening at the bottom thereof and which is adapted to receive the boss 27 of the corner-plates 28, which are secured to each lower corner of the section 8 to prevent any lateral or longitudinal movement thereof when in a lowered position. To facilitate the entrance of the bosses 28 in the sockets 26, the former are somewhat tapered, as shown, and by this arrangement the section 8 is secured in a vertical position against the door-jambs.

For retaining the upper section 7 in position the top of the same has secured thereto a pair of plates 29, upon which operate the end of the hook 30. This hook 30 has one end formed with an angularly-disposed slot 31 for mounting upon a retaining-screw 32, secured to the door-jamb 6. In practice the hook 30 is elevated until the lower end of the slot 31 comes into engagement with the screw 32 and the opposite end of the hook is brought over and against the plate 29, the slotted end of the hook being then lowered until the upper end of the slot 31 is in engagement with the screw 32, thus securely clamping the section 7, as well as the section 8, in position.

For supporting or suspending the sections 7 8 in a horizontal position when swung clear of the car-door opening a downwardly-extending hanger 33 is provided and is formed with a bifurcated upper end 34 and an offset 35, both of which are secured to a rafter 36 of the car by any desirable means. In the lower end of the hanger 33 is arranged an opening 37, having pivotally connected therein, by means of the pin 38, an outwardly-extending catch 40, provided with a thumb-piece 39. The catch 40 is adapted to engage the lower end of the section 8 and support the sections when swung horizontally.

The lower section 8 of the car-door is formed at the bottom thereof with a pair of openings 41 to permit of the insertion of a lever 42 to assist in raising the door, as shown in Fig. 4. These openings are closed by means of a shutter or gate 43, pivotally connected to a bracket 44, connected to the inner face of the section 8, near the bottom thereof. The shutters or gates 43 are adapted to swing inwardly.

To raise the door from the position shown in Figs. 1 and 2, the lever 42 is inserted through the openings 41 and the sections elevated, causing the section 7 to assume a tilting position, the lever being removed and the sections elevated, by means of the hand-grip 12, until it assumes the position shown in Fig. 5, when the sections are swung inwardly and retained in a horizontal position by means of the catch 40 of the hanger 33. When the sections are in this position, the upper edge of the section 8 rests against the brackets 14 and is supported on the bearing 45, formed integral with the bracket 14, and the section 8 securely held against movement in either direction. To lower the grain-door to the floor of the car, the lower edge of the section 8 is raised until it clears the catch 40, and it is then swung downwardly against the door-jambs, as shown in Fig. 5, the top of the section 8 being then pulled over and downward and the section lowered to the floor, during the travel thereof the section 7 assuming its normal position.

It is thought the many advantages of my improved construction of grain-car door to be swung entirely free from the sides of the car to prevent injury thereto can be readily understood from the foregoing description, taken in connection with the accompanying drawings, and it will be noted that various changes can be made in the details of construction without departing from the general spirit of my invention.

Having thus fully described my invention, what I claim as new, and desire to secure by Letters Patent, is—

1. The combination with a car provided with a door-opening having a pair of sockets at the lower corners thereof, of a door arranged in said opening and consisting of an upper and lower section, a pair of plates each carrying a boss connected to said lower section and adapted to engage in said sockets, a bracket secured to said lower section and provided with a bearing-sleeve, a plate connected to said upper section and having its lower end bifurcated, a bearing-pin formed integral with one end of said plate, means for connecting said bifurcated end to said bearing-sleeve, and a link or hanger pivotally connected at one end to the car and at its opposite end suitably connected to said bearing-pin, substantially as described.

2. The combination with a car provided with a door-opening having a pair of sockets at the lower corners thereof, of a door arranged in said opening and consisting of an upper and lower section, a pair of plates each carrying a boss connected to said lower section and adapted to engage in said sockets, a bracket secured to said lower section and provided with a bearing-sleeve, a plate connected to said upper section and having its lower end bifurcated, a bearing-pin formed integral with one end of said plate, means for connecting said bifurcated end to said bearing-sleeve, a bracket secured to the car and carrying a bearing-sleeve, a link or hanger pivotally connected at one end to said sleeve and at its opposite end provided with an oval-shaped opening, and means for connecting said bearing-pin to the oval-shaped opening of said link or hanger.

3. The combination with a car provided with a door-opening having a pair of sockets at the lower corners thereof, of a door arranged in said opening and consisting of an upper and lower section, a pair of plates each carrying a boss connected to said lower section and adapted to engage in said sockets, a bracket secured to said lower section and provided with a bearing-sleeve, a plate connected to said upper section and having its lower end bifurcated, a bearing-pin formed integral with one end of said plate, means for connecting said bifurcated end to said bearing-sleeve, a bracket secured to the car and carrying a bearing-sleeve, a link or hanger pivotally connected at one end to said sleeve and at its opposite end provided with an oval-shaped opening, means for connecting said bearing-pin to the oval-shaped opening of said link or hanger, and means connected to a car and adapted to engage said lower section for supporting said sections in a horizontal manner, substantially as described.

4. A grain-car door comprising in its construction an upper and lower section, means for hinging one section to the other below the abutting edges of said sections and means for causing the upper section to fold upon the lower section when the same is raised.

5. A grain-car door comprising in its construction an upper and lower section, means for hinging one section to the other below the abutting edges of said sections, means for causing the upper section to fold upon the lower section when the same is raised, and means engaging the ends of said lower section for suspending the same from a car-roof.

6. A door for freight or other cars comprising in its construction an upper and lower section hinged together and hangers pivotally connected at their one end to the car and at their lower end slidably secured to said upper section for causing the latter to fold upon the lower section when the same is raised.

7. A door for freight or other cars comprising in its construction an upper and lower section hinged together, hangers suitably connected at one end to the car and at their opposite end slidably secured to the upper section causing the latter to fold upon the lower section when the same is adjusted vertically, and a pair of plates pivotally connected to said lower section to permit the entrance of a lever for vertically elevating the former.

8. A door for freight or other cars comprising in its construction an upper and lower section hinged together, brackets secured to the car, hangers pivotally connected to said brackets and slidably secured to the upper section so that when the lower section is elevated vertically the upper section will fold thereon, bearings carried by said brackets for horizontally supporting said lower section at one end thereof, and means carried by the car and engaging the opposite end of said lower section for supporting the same horizontally.

9. A door for freight or other cars comprising in its construction an upper and lower section hinged together, brackets secured to the car, hangers pivotally connected to the said brackets and slidably secured to the upper section so that when the lower section is raised the upper section will fold thereon, bearings carried by said brackets for horizontally supporting the said lower section at one end thereof, means carried by the car and engaging the opposite end of said lower section for supporting the same horizontally and a pair of plates carried by the lower section to permit the entry of a lever for vertically elevating the former.

10. A grain-car door comprising in its construction an upper and lower section, the latter provided with a pair of openings, plates pivotally connected to said lower section for closing said openings and means connected to said sections for causing the upper to fold upon the lower when they are elevated.

11. A grain-car door comprising in its construction an upper and lower section, the latter provided with a pair of openings, a pair of plates pivotally connected to the inner face of said lower section for closing said openings and means connected to said sections for causing the upper to fold upon the lower when they are elevated.

12. A grain-car door comprising in its construction an upper and lower section, the latter provided with a pair of openings, a pair of inwardly-swinging plates connected to said lower section for closing said openings and means connected to said sections for causing the upper to fold upon the lower when they are elevated.

13. A door for freight or other cars consisting of an upper and lower section hinged together, means connected at one end to a car and at its lower end to said upper section for causing the latter to fold upon the lower section when the same is raised and means carried by the car and engaging said upper section for suspending the same from a car-roof.

14. A door for freight or other cars, consisting of an upper and lower section hinged together, means connected at one end to a car and at its opposite end to said upper section causing the latter to fold upon said lower section when the same is raised, means carried by the car and engaging said lower section for suspending the same from a car-roof, and means carried by the car for securing said sections to the side thereof.

15. A door for freight or other cars, consisting of an upper and lower section hinged together, means connected at one end to a car and at its opposite end to said upper section causing the latter to fold upon the lower section when the same is raised, means carried by the car and engaging said lower section for suspending said section from a car-roof, a hook engaging said sections for securing the same vertically to the car and provided with an angularly-disposed slot, and means extending through said slot for slidably connecting said hook to the car.

16. A grain-car door comprising in its construction an upper and lower section, means for hinging the sections together to permit of the upper section folding upon the lower section, and hangers connected to said upper section for causing the same to fold upon the lower section when the latter is elevated.

17. A grain-car door comprising an upper and lower section suitably hinged together, hangers pivotally secured at one end to a car and at their other end slidably connected to said upper section causing thereby the folding of the latter upon the lower section when the same is elevated.

18. A grain-car door comprising an upper and lower section hinged together, hangers connected to the car and said upper section for causing the latter to fold upon the lower section when the same is elevated, and means adapted to engage said lower section for supporting the sections horizontally.

In testimony whereof I have hereunto set my hand in presence of two subscribing witnesses.

CHARLES LINSTROM.

Witnesses:
M. J. DONOVAN,
G. B. HARPER.